Oct. 28, 1930.  C. A. GILLINGHAM  1,779,767
DRY BATTERY
Filed April 26, 1927   3 Sheets-Sheet 1

INVENTOR:
Charles A. Gillingham,
BY
ATTORNEYS.

Oct. 28, 1930.   C. A. GILLINGHAM   1,779,767
DRY BATTERY
Filed April 26, 1927   3 Sheets-Sheet 2

INVENTOR:
Charles A. Gillingham,
BY
Byrne Townsend & Brickenstein
ATTORNEYS.

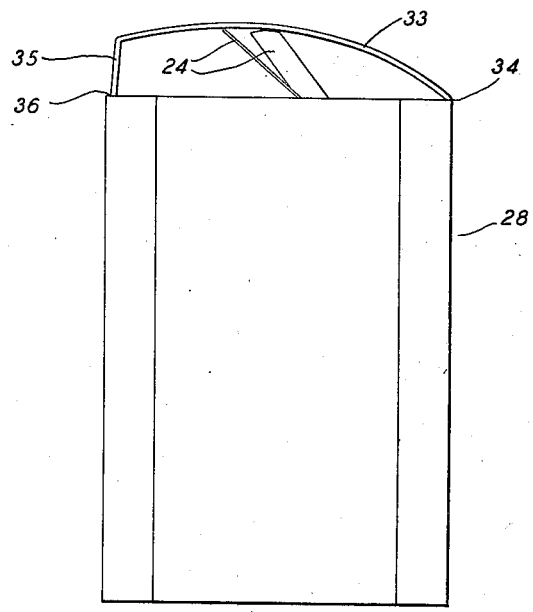
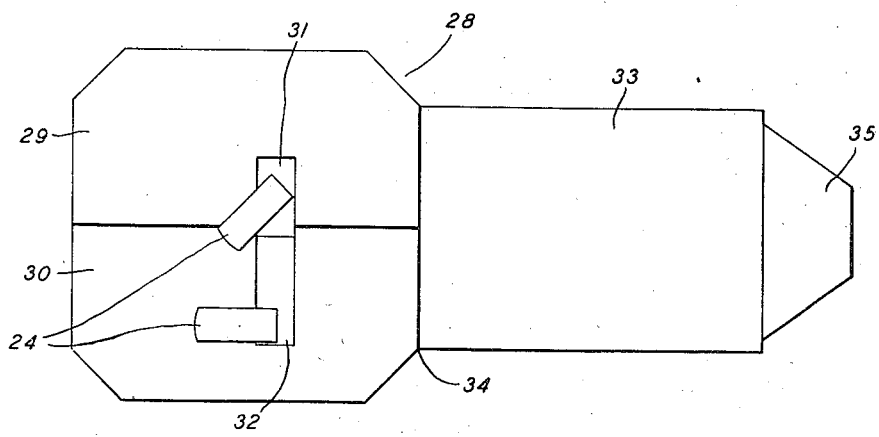

Patented Oct. 28, 1930

1,779,767

UNITED STATES PATENT OFFICE

CHARLES A. GILLINGHAM, OF LAKEWOOD, OHIO, ASSIGNOR TO NATIONAL CARBON COMPANY, INC., A CORPORATION OF NEW YORK

DRY BATTERY

Application filed April 26, 1927. Serial No. 186,763.

This invention relates to dry batteries and more particularly to a unitary dry battery assembly for use in hand lanterns, miners' lamps and the like.

Batteries for operating battery lamps and lanterns used by railway men, miners and others who require more or less continuous illumination are usually made up of a plurality of cells. Generally, four cells are used. Such lamps and lanterns are subjected to considerable rough usage and as one of the consequences of such usage short-circuiting of the battery may result due to shifting of the cells within the battery casing or to the shifting of the insulating strips used to separate the cells or to maintain the cell-connecting lead wires out of undesired contact with the metallic portions of the cells. In order to keep the connecting lead wires out of undesired contact with the electrodes of the individual cells, it has been proposed to embed the cells or at least the upper portions thereof, in an insulating plastic composition, and this method is now commonly employed in producing high voltage batteries used in radio communication.

The present invention has for an object the production of a lantern battery assembly in which the cells are positively held against relative movement. A further object is to provide a new and improved means for positively insulating the connecting lead wires from undesired contact with the cell electrodes. This feature of the invention is not considered as limited to lantern batteries and the like, but is considered applicable to other types of multi-cell batteries, such for example as those of the high voltage type above mentioned in which plastic sealing material is now used for accomplishing this purpose.

Another object of the invention is to provide means for properly spacing the terminal contacts and also to hold such contacts in such a manner that they cannot be bent to a sharp angle thus maintaining them in proper position for making electrical contact with the terminals of the incandescent lamp bulb of the lantern and also preventing breakage of the terminal contacts. A further object is to provide means for protecting the terminal contacts during shipment or handling prior to placing the battery in service. The invention also comprises a new method of battery assembly. Other objects and advantages of the invention will appear as the description proceeds.

Referring to the drawings:

Fig. 7 is a side elevation of the finished battery showing the assembly fitted within a suitable insulating carton or container provided with a removable flap adapted to protect the terminal contact strips during shipment and handling before the battery is placed in service.

Fig. 8 is a top plan view of the finished battery showing the protective flap bent back out of its normal position so as to disclose more clearly the supplemental flaps which fold over the top of the battery assembly.

Figure 1:
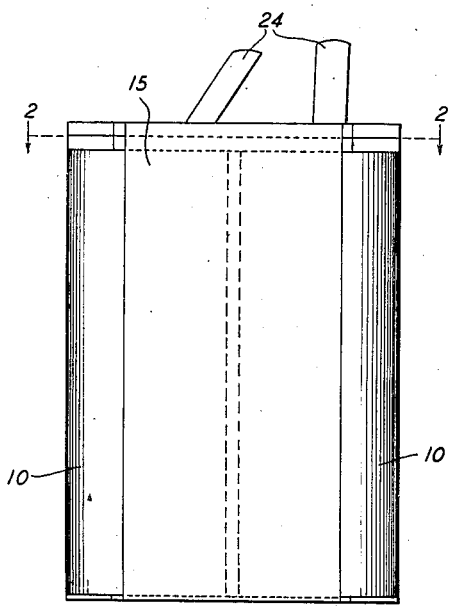
Fig. 1 is a side elevation of a battery assembly embodying the present invention.
Figure 2:
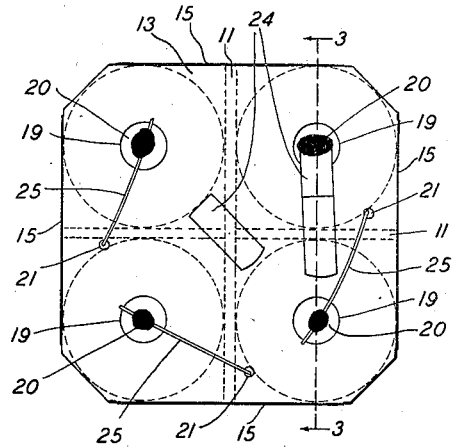
Fig. 2 is a view partly in section and partly in plan taken on the line 2—2 of Fig. 1.
Figure 3:
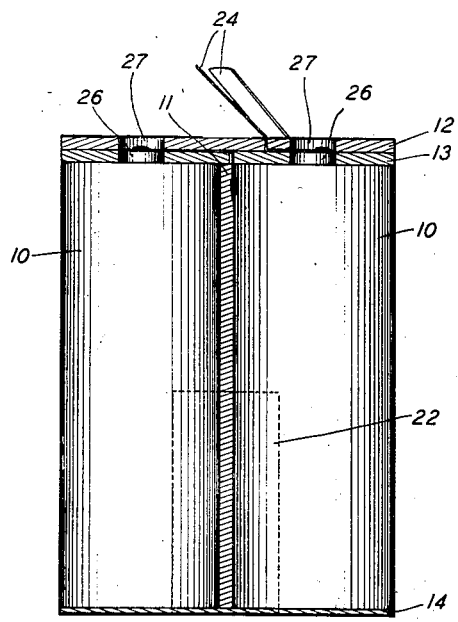
Fig. 3 is a vertical sectional view taken on the line 3—3 of Fig. 2.
Figure 4:
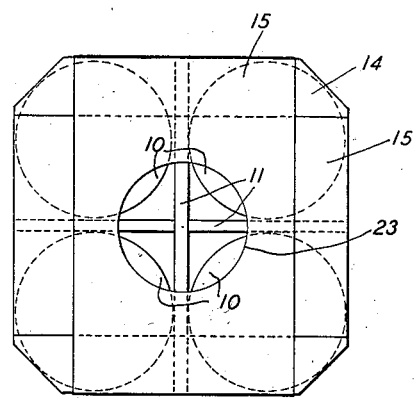
Fig. 4 is a bottom plan view.
Figure 5:
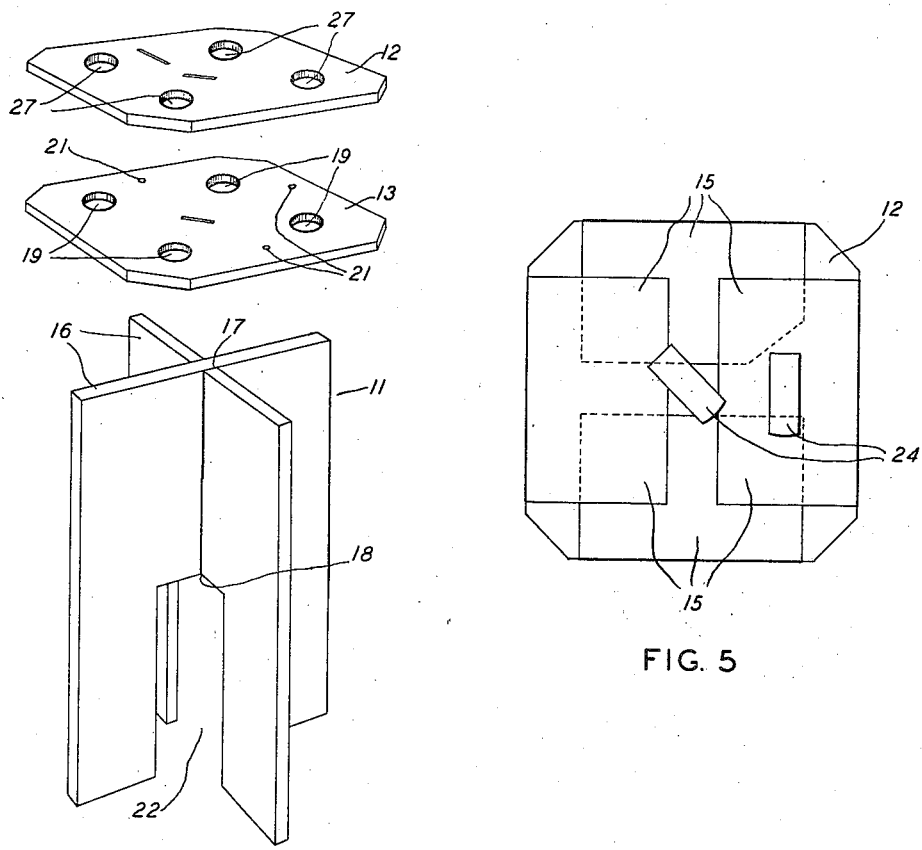
Fig. 5 is a top plan view of the complete assembly.
Figure 6:
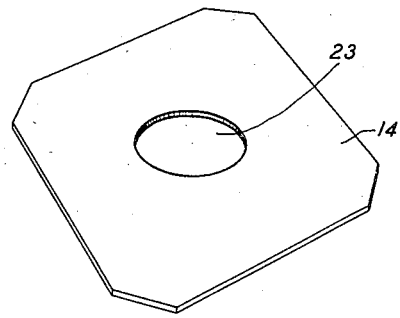
Fig. 6 is a perspective view of the cell-spacing and insulating structure with the cells and the paper binding tape removed, and with the top and bottom cardboard sheets out of contact with the central cell-spacing structure but so situated as to indicate their relative positions in the assembly.

The battery assembly shown in the drawing consists of four cylindrical dry cells 10, each positioned in one of the four pockets or recesses of a centrally disposed insulating structure 11, and insulating sheets 12, 13 and 14 held against the ends of the assembly by strips of gummed paper tape 15 or similar insulating strip material. The centrally disposed cell-spacing structure 11 which is shown in Fig. 6 is formed by so fitting together two sheets 16 of cardboard or similar stiff insulating material, provided respectively with slots 17 and 18, that the sheets are interlocked at right angles. As shown in Fig. 2 the sheet 13 is provided with openings 19 adapted to receive the terminal ends 20 of the central carbon rod electrodes of the respective cells. Smaller openings 21 are also provided through which the cell connecting lead wires may be threaded. The cardboard sheets 16 are each cut out at the bottom as shown at 22 to provide a space for the reception of a spare lamp bulb. The bottom sheet 14 is provided with a central opening 23 to permit of access to the storage space referred to above. Terminal contacts 24, shown in the drawing as resilient brass strips, are led from the appropriate cell electrodes through slits in the insulating sheets 12 and 13. This permits the sheet material to fit closely about the contact strips to hold them in predetermined positions and at a desired angle, thereby insuring their being positioned properly for contact with the terminal connections of the lamp bulb. By firmly embedding or fixing the terminal contacts in the insulating sheets, the possibility of bending the contacts to a sharp angle is eliminated, particularly at the point where they are soldered to the respective cell electrodes where they may be relatively easily broken.

In assembling the battery, the cell-spacing structure 11 is positioned on the bottom insulating sheet 14 and the cells 10 are positioned in the pockets of the structure 11. Lead wires 25 are soldered to the upper peripheral edge portions of the zinc cups of the respective cells either at this stage of the assembling operation or before the cells are placed in the assembly. Similarly, one of the terminal contact strips 24 is soldered to the zinc cup electrode of one of the end cells in the series. The insulating sheet 13 is next fitted over the assembly with the exposed ends of the carbon rod electrodes, which carry the usual brass caps 26, projecting into the openings 19 and with their upper edge portions substantially flush with the upper surface of the sheet 13. At the same time the free ends of the lead wires 25 are threaded through the openings 21. The free end of the terminal contact 24 above mentioned is also caused to pass through an aperture made in the sheet 13. The free ends of the lead wires 25 are then soldered to the brass caps of the appropriate electrodes of adjacent cells so as to connect the cells in series. At this point in the procedure, the other terminal contact strip 24 may be soldered to the brass cap of the other end cell of the series. The upper insulating sheet 12 is then placed on the assembly, the contact strips 24 being caused to pass through slits therein so as to be closely held thereby at any desired angle. The insulating sheet member 12 is shown as provided with openings 27 corresponding with the openings 19 in the sheet 13 to better accommodate the enlargement of the ends of the carbon terminals due to the soldering of the lead wires thereto. It is readily apparent, however, that these openings may be eliminated, particularly if the sheet 13 is of such thickness that the carbon electrodes do not project entirely through to the upper side of the sheet.

Finally, strips of gummed paper tape are passed around the assembly from end to end to bind the same into a unitary structure. Preferably, the assembly is subjected to endwise pressure during the taping operation to insure that the cells and other elements of the assembly shall be held in close-fitting more or less rigid relation to one another. The assembly is now ready for insertion in a cardboard carton or similar container adapted to insulate the battery from the metallic parts of the lantern and protect the assembly against moisture, etc.

In Figs. 7 and 8 is shown an improved cardboard carton or container 28 with a completed battery assembly fitted therein. The carton is provided with two flaps 29 and 30 adapted to fold over the top of the assembly and provided, respectively, with slots 31 and 32 adapted to receive the terminal contacts 24. The flaps above-mentioned are pressed down into contact with the top of the battery assembly and caused to adhere thereto by a suitable adhesive, thus presenting a smooth, substantially unbroken surface and giving a neat appearance to the finished battery. In order to protect the terminal contacts 24 against short-circuiting or damage during shipment and handling prior to placing the battery in service, a removable flap 33 is provided. This flap is integrally joined at 34 to one side wall of the carton and is adapted to be bent over the top of the carton and held in place over the projecting terminal contacts 24 during the period prior to operation of the battery by inserting an end portion 35 of the flap between the side wall and the enclosed battery assembly on the side opposite to that wall of the carton to which the flap is attached as indicated at 36. When the battery is to be placed in use the flap 33 is torn off at 34 leaving the terminal contacts exposed for use but with the top of the battery presenting a neat and finished appearance due to the closure of the end of the carton by the flaps 29 and 30 above-mentioned.

Various changes in the details of the method of assembling the cells and also in details of construction may be made without departing from the scope of the invention which is indicated in the statement of the objects of the invention set forth above and in the appended claims.

What I claim is:

1. A battery comprising a container, a unitary assembly of cylindrical dry cells in said container with the cells in upright position, a cover for said container consisting of a plurality of flexible sheet members folded over the top of said assembly and affixed thereto, terminal contacts extending through the cover and a supplemental sheet member adapted to be folded over the top of the battery and to enclose the projecting terminal contacts during the period prior to placing the battery in service and removable when the battery is placed in use.

2. A battery assembly comprising a plurality of dry cells, sheet insulating members therebetween, sheet insulating members at ends thereof, taping means extending therebetween, and adherent thereto, terminal members contained in one of said second mentioned sheet members, and a casing member surrounding said assembly, and adherent thereto, having a detachable tab member adapted to cover and protect said terminals.

3. A battery assembly comprising a plurality of dry cells, separator means therebetween comprising a plurality of sheets of insulating material, slotted for appropriate engagement at right angles, and notched for the provision of a clear storage space, and means for holding the assembly together, comprising perforated end members of sheet insulating material and tape members adherent thereto passing around said cells.

4. A battery assembly comprising a plurality of dry cells, separator means therebetween comprising a plurality of sheets of insulating material, slotted for appropriate engagement at right angles, and notched for the provision of a clear storage space, and means for holding the assembly together, comprising end members of sheet insulating material, tape members adherent thereto passing around said cells, and a bottom member comprising a sheet of insulating material having an opening adapted to cooperate with the notches in said first-mentioned sheet members for the passage of objects thereinto.

In testimony whereof, I affix my signature.

CHARLES A. GILLINGHAM.